United States Patent
Macours

(10) Patent No.: US 9,609,418 B2
(45) Date of Patent: Mar. 28, 2017

(54) SIGNAL PROCESSING CIRCUIT

(71) Applicant: NXP B.V., Eindhoven (NL)

(72) Inventor: Christophe Marc Macours, Leuven (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/718,223

(22) Filed: May 21, 2015

(65) Prior Publication Data
US 2015/0358715 A1 Dec. 10, 2015

(30) Foreign Application Priority Data

Jun. 6, 2014 (EP) .................... 14171613

(51) Int. Cl.
H04R 1/10 (2006.01)
H04R 5/04 (2006.01)
(Continued)

(52) U.S. Cl.
CPC ............ H04R 1/1041 (2013.01); H04R 5/04 (2013.01); H04S 7/308 (2013.01); H04M 1/6058 (2013.01); H04R 3/04 (2013.01); H04R 3/12 (2013.01); H04R 5/033 (2013.01); H04R 2420/01 (2013.01); H04R 2420/03 (2013.01); H04R 2420/05 (2013.01); H04R 2430/03 (2013.01); H04R 2499/11 (2013.01); H04S 2420/07 (2013.01)

(58) Field of Classification Search
CPC H04R 1/1041; H04R 2420/07; H04R 1/1016; H04R 5/033; H04R 1/10; H04R 2201/107; H04R 2410/01; H04R 29/001; H04R 3/12; H04R 5/04; H04R 1/1083; H04R 2201/028; H04R 2420/05; H04R 2460/01; H04R 2499/11; H04R 3/00; G06F 3/165; G06F 13/4022; H04B 1/006; H04M 1/0258
USPC 381/74, 309, 380, 58, 120, 375, 59, 91, 92, 381/94.1
See application file for complete search history.

(56) References Cited

U.S. PATENT DOCUMENTS 7,466,828 B2 * 12/2008 Ito .................... H04B 1/082
381/119
2004/0157555 A1 8/2004 Richenstein et al.
(Continued)

FOREIGN PATENT DOCUMENTS

KR 2001 0081244 A 8/2001
KR 2008 0013608 A 2/2008

OTHER PUBLICATIONS

Extended European Search Report for Application No. 14171613.4 (Mar. 26, 2015).

Primary Examiner — Paul S Kim
Assistant Examiner — Norman Yu

(57) ABSTRACT

A signal processing circuit comprising: a first signal processor configured to produce a first output signal suitable for driving a first headphone speaker; a second signal processor configured to produce a second output signal suitable for driving a second headphone speaker; a third signal processor configured to receive the first input signal and/or the second input signal and to produce a third output signal suitable for driving a first loudspeaker; and simultaneously provide the first output signal to the first headphone speaker, the second output signal to the second headphone speaker, and the third output signal to the first loudspeaker.

18 Claims, 4 Drawing Sheets

(51) Int. Cl.
  *H04S 7/00* (2006.01)
  *H04R 29/00* (2006.01)
  *H04M 1/60* (2006.01)
  *H04R 3/04* (2006.01)
  *H04R 3/12* (2006.01)
  *H04R 5/033* (2006.01)

(56) References Cited

U.S. PATENT DOCUMENTS

| | | | |
|---|---|---|---|
| 2005/0195998 A1* | 9/2005 | Yamamoto | H04R 5/04 381/119 |
| 2008/0118078 A1* | 5/2008 | Asada | H04S 3/008 381/74 |
| 2008/0166002 A1 | 7/2008 | Amsel | |
| 2009/0315688 A1 | 12/2009 | Kong et al. | |

* cited by examiner

SIGNAL PROCESSING CIRCUIT

CROSS-REFERENCE TO RELATED APPLICATIONS

This application claims the priority under 35 U.S.C. §119 of European patent application no. 14171613.4, filed on Jun. 6, 2014, the contents of which are incorporated by reference herein.

This disclosure relates to a signal processing circuit configured to improve the perception of sound localisation by users of headphones connected to audio and particularly audio-visual devices.

According to a first aspect, there is provided a signal processing circuit comprising:
- a first signal processor configured to receive a first input signal and to process the first input signal to produce a first output signal suitable for driving a first headphone speaker;
- a second signal processor configured to receive a second input signal and to process the second input signal to produce a second output signal suitable for driving a second headphone speaker;
- a third signal processor configured to receive the first input signal and/or the second input signal and to produce, based on the received signal or signals, a third output signal suitable for driving a first loudspeaker; and
- simultaneously provide the first output signal to the first headphone speaker, the second output signal to the second headphone speaker, and the third output signal to the first loudspeaker.

The first signal processor may comprise a first filter. The second signal processor may comprise a second filter. The first filter may be a low pass filter. The second filter may be a low pass filter.

The third signal processor may comprise a third filter. The third filter may be a high pass filter.

The first signal processor may comprise a first delay line configured to provide a delayed first output signal. The second signal processor may comprise a second delay line configured to provide a delayed second output signal.

The first headphone may comprise a first microphone configured to provide a first information signal, relating to measured sounds, to the signal processing circuit. The signal processing circuit may be configured to set the length of a delay applied by the first delay line based on the first information signal. The second headphone may comprise a second microphone configured to provide a second information signal, relating to measured sounds, to the signal processing circuit. The signal processing circuit is may be configured to set the second delay line based on the second information signal.

The signal processing circuit may further comprise a switching signal processor configured to receive a switching signal from a user interface. The first output signal, the second output signal and the third output signal may be simultaneously provided based on the switching signal. Only the first output signal and the second output signal, or only the third output signal may be provided based on the switching signal.

The third signal processor may be configured to receive the first input signal and the second input signal. The third signal processor may be configured to produce: the third output signal, based on the first input signal; and a fourth output signal, based on the second input signal, suitable for driving a second loudspeaker. The third signal processor may be configured to simultaneously provide the first output signal to the first headphone speaker, the second output signal to the second headphone speaker, the third output signal to the first loudspeaker, and the fourth output signal to the second loudspeaker.

The third signal processor may comprise a gain unit configured to provide an amplified third output signal. The first headphone may comprise a first microphone configured to provide a first information signal, relating to measured sounds, to the signal processing circuit. The signal processing circuit may be configured to set a level of gain applied by the gain unit based on the first information signal.

The third signal processor may comprises an equalizer configured to provide an equalized third output signal. The first headphone may comprise a first microphone configured to provide a first information signal, relating to measured sounds, to the signal processing circuit. The signal processing circuit may be configured to set the level of equalization applied by the equalizer based on the first information signal.

There may be provided an integrated circuit comprising any signal processing circuit disclosed herein.

There may be provided an electronic device comprising any signal processing circuit disclosed herein, and optionally one or more of: a first headphone speaker, a second headphone speaker and a first loudspeaker. The first headphone speaker may be configured to provide audio to a user in accordance with the first output signal. The second headphone speaker may be configured to provide audio to the user in accordance with the second output signal. The first loudspeaker may be configured to provide audio to the user in accordance with the third output signal.

There may be provided a computer program, which when run on a computer, causes the computer to configure any apparatus, including a circuit, controller, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

BRIEF DESCRIPTION OF THE DRAWINGS

Examples of the invention will now be described in detail with reference to the accompanying figures, in which.

DETAILED DESCRIPTION

Many electronic devices provide users with both audio and video content. In many examples, the audio content may be provided by either a loudspeaker, or loudspeakers, contained within the device or alternatively by a pair of headphones or earphones. It will be appreciated that in the following disclosure references to headphones include earphones and other equivalent in-ear audio devices.

Figure 1:
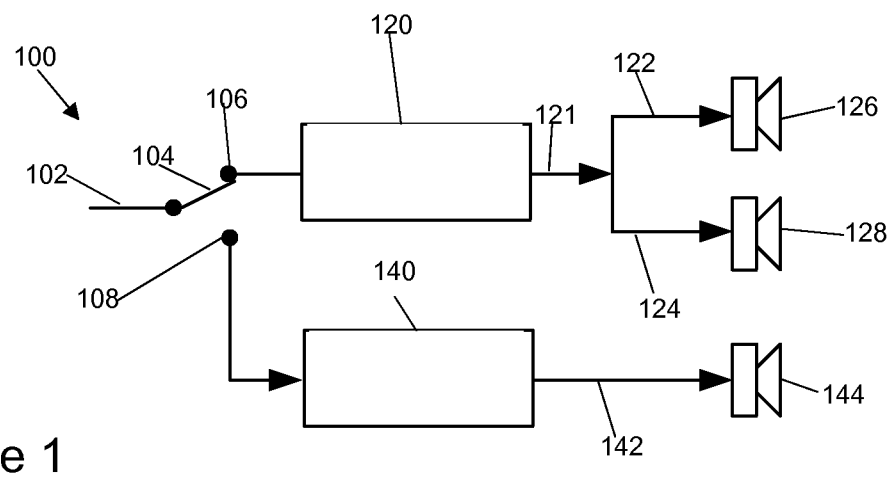
FIG. 1 shows a schematic diagram that illustrates the operation of a signal processing circuit configured for use with either headphones or a loudspeaker.

FIG. 1 illustrates the operation of signal processing apparatus 100 in an electronic device. Information representative of an audio signal is provided at a first terminal 102. This information may be transmitted via a switch 104 to a headphone input terminal 106 as shown. Alternatively, the switch 104 may be set (not illustrated) to supply the information to a loudspeaker input terminal 108. Such switches 104 can provide information to either the headphone input terminal 106 or to the loudspeaker input terminal 108 but not to both. That is, headphone playback and hands-free playback use-cases are mutually exclusive and have their own audio processing and amplification paths.

The headphone input terminal 106 enables the information to be supplied to a headphone signal processing circuit 120. The circuit 120 may perform any known form of signal processing, for example amplification, in order to generate a headphone output signal 121. The headphone output signal 121 may be split into a left headphone signal 122 and a right headphone signal 124 if the headphones are configured to provide stereo sound. The left headphone signal 122 may then be supplied to a left headphone 126 to generate a left audio signal and the right headphone signal 124 may be supplied to a right headphone 128 to generate a right audio signal.

The information provided at the first terminal 102 may instead be provided to the loudspeaker input terminal 108 which enables the information to be supplied to a loudspeaker signal processing circuit 140. This loudspeaker signal processing circuit 140 may perform any known form of signal processing, for example amplification, in order to generate a loudspeaker output signal 142 which may be supplied to a loudspeaker 144 in order to generate an audio signal.

There are certain advantages to using headphones to supply audio content to a user; headphones may provide superior low frequency sound reproduction, headphones may also partly isolate the user from surrounding noise. However, certain disadvantages with headphones also exist: when a virtual sound source is positioned in the median plane (the plane separating the two ears and running vertically through the head), many users report that they perceive sound as being localised within their head (inside-the-head localisation) and may also report that they perceive the sound as originating from behind their head, when it is intended to seem as if it is originating from in-front (so-called front-back confusion effects). This can particularly occur when the inter-aural differences are very small, the auditory system must rely on other auditory cues such as pinna and torso reflections, which are highly individual. Such perceptions are undesirable, especially when the audio content is provided in conjunction with video content; in some examples the user should perceive the audio as coming from the same location as the video content. Providing an appropriate 'out-of-head' audio experience is one of the major challenges of headphone design.

Figure 2:
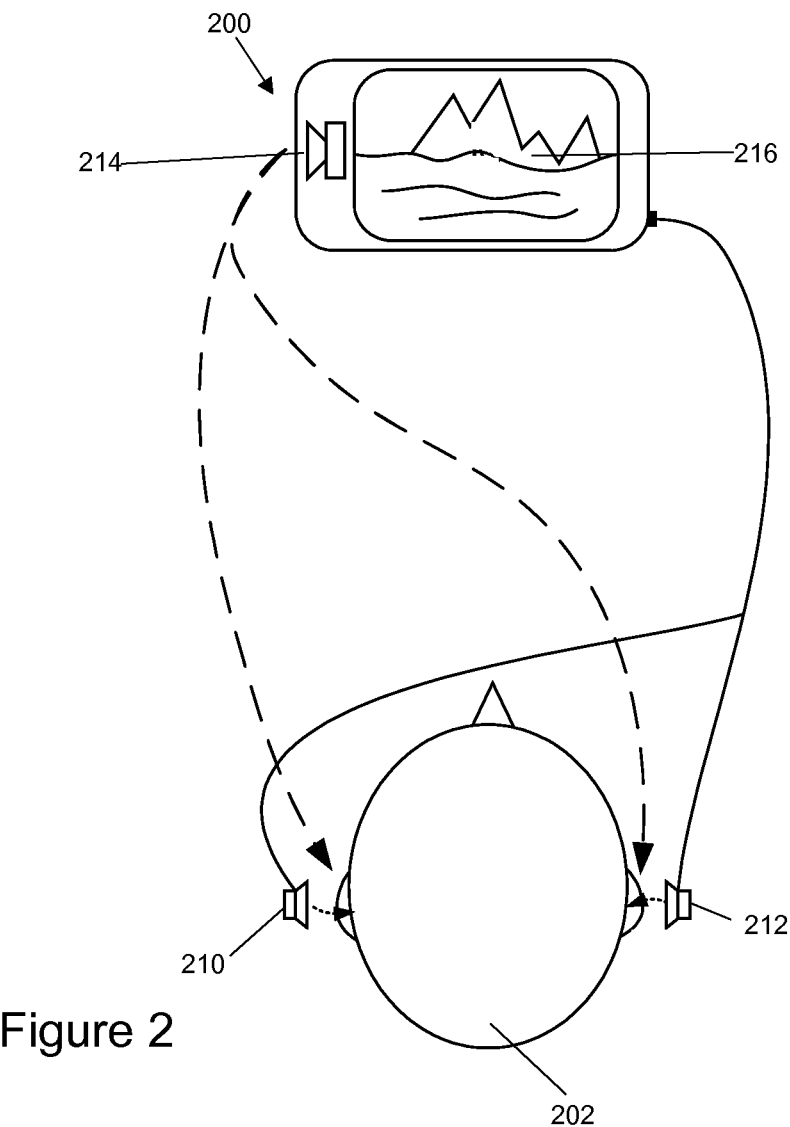
FIG. 2 shows a device configured to provide audio signals to a user via both headphones and a loudspeaker simultaneously.

FIG. 2 illustrates an improved electronic device 200 configured to provide audio content to a user 202 by both headphones 210, 212 and a loudspeaker 214 simultaneously. When the loudspeaker 214 is situated near to a screen 216 that is used to display video content, the provision of audio from the loudspeaker 214 may enable the user 202 to perceive the provided audio content as coming from the screen 216. This perception may apply to the entire audio content giving the user the impression that the audio supplied by the headphones 210, 212 is actually coming from the screen 216. The frequencies involved in sound localisation can be predominantly relatively high frequencies. It may therefore be sufficient to provide only high frequencies to the loudspeaker 214 while using the headphones 210, 212 to provide all of the low frequency components to the user. The headphones 210, 212 can be connected through a wired or wireless connection to a mobile device such as the electronic device 200.

Acoustical transfer functions ($LS2E_L$ and $LS2E_R$) are defined between the internal device loudspeaker 214 and the left and right listener's ears respectively, in the presence of the headphones 210, 212. $LS2E_L$ and $LS2E_R$ can have the particularity that they convey the listener's individual monaural localisation cues needed for frontal externalization, which are mostly located at high frequencies. Acoustical transfer functions ($HP2E_L$ and $HP2E_R$) are also defined between the left/right headphone loudspeakers and the left/right ears.

Figure 3A:
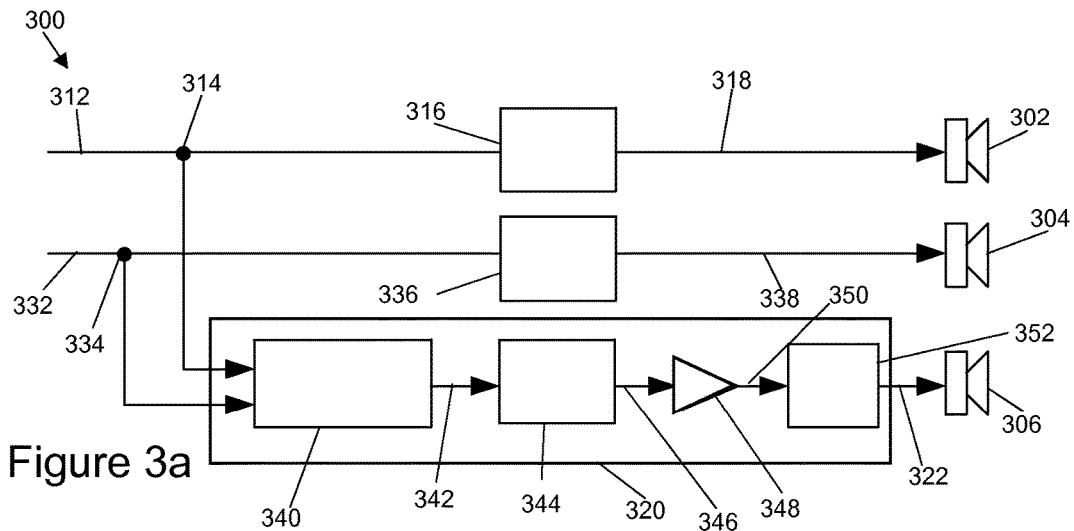
FIG. 3a shows a schematic diagram that illustrates the operation of a signal processing circuit configured for use with both headphones and a loudspeaker simultaneously.

FIG. 3a illustrates the arrangement of a signal processing circuit 300 configured to provide audio to a user simultaneously via both a pair of headphones, which comprise a left headphone 302 and a right headphone 304, and a loudspeaker 306.

A left signal 312 is provided to a left node 314. The left node 314 enables the left signal 312 to be provided to a left headphone signal processor 316 and also to a loudspeaker signal processor 320. The left headphone signal processor 316 may perform any known form of signal processing, such as amplification, before providing a left driver signal 318 to the left headphone 302. The left headphone 302 may then provide a left audio output based on the left driver signal 318. The left headphone signal processor 316 is an example of a first signal processor that receives a first input signal (the left signal 312) and processes the first input signal (the left signal 312) to produce a first output signal (the left driver signal 318) suitable for driving a first headphone speaker (the left headphone 302).

A right signal 332 is provided to a right node 334. The right node 334 enables the right signal 332 to be provided to a right headphone signal processor 336 and also to the loudspeaker signal processor 320. The right headphone signal processor 336 may perform any known form of signal processing, such as amplification, before providing a right driver signal 338 to the right headphone 304. The right headphone 304 may then provide a right audio output based on the right driver signal 338. The right headphone signal processor 336 is an example of a second signal processor that receives a second input signal (the right signal 332) and processes the second input signal (the right signal 332) to produce a second output signal (the right driver signal 338) suitable for driving a second headphone speaker (the right headphone 304). The first input signal may be the same as, or different to, the second input signal.

The left headphone signal processor 316 and the right headphone signal processor 336 may also be configured to operate as filters. In some examples they may act as low-pass filters. In this case, the audio provided by the headphones 302, 304 may contain only low frequency components. Low frequency components can be considered as audio signals that have a frequency of less than about 2000 Hz, 4000 Hz, or 8000 Hz, in some examples.

The loudspeaker signal processor 320 is configured to mix the left signal 312 with the right signal 332 to provide a loudspeaker driver signal 322. The loudspeaker driver signal 322 is provided to the loudspeaker 306, which is configured to provide audio content based on the loudspeaker driver signal 322. The loudspeaker signal processor 320 is an example of a third signal processor that receives the first input signal (the left signal 312) and the second input signal (the right signal 332) and produces, based on the received signals, a third output signal (the loudspeaker driver signal 322) suitable for driving a first loudspeaker (the loudspeaker 306). It will be appreciated from the description that follows that in other examples, a third signal processor can receive either a first input signal or a second input signal and produce, based on the received signal, a third output signal suitable for driving a first loudspeaker.

The circuit of FIG. 3a may also include a switching signal processor (not shown) that can receive a switching signal from a user interface indicative of whether or not the user wishes to simultaneously receive audio from the headphones and loudspeaker. Based on the switching signal, the switching signal processor can simultaneously provide:
  i. the left driver signal 318 (a first output signal) to the left headphone 302 (a first headphone speaker),
  ii. the right driver signal 338 (a second output signal) to the right headphone 304 (a second headphone speaker), and
  iii. the loudspeaker driver signal 322 (a third output signal) to the loudspeaker 306 (a first loudspeaker).

If the switching signal is indicative of the user not wanting to simultaneously receive audio from the headphones and loudspeaker, then the switching signal processor will not simultaneously provide i, ii and iii above. Instead, the switching signal processor may provide only i and ii, or may provide only iii. It will be appreciated that providing a driver signal to a headphone/loudspeaker may involve making that signal available at an output jack/terminal of an electronic device.

In some examples the loudspeaker signal processor 320 may perform other signal processing operations. For example, there may be a downmixer 340 configured to combine the left signal 312 with the right signal 314. The downmixer 340 may provide a downmixed signal 342 to a filter 344. The filter 344 may be a high-pass filter that passes only the high frequency components of the signal and thereby produces a filtered signal 346. High frequency components can be considered as audio signals that have a frequency of greater than about 2000 Hz, 4000 Hz, or 8000 Hz, in some examples.

The filtered signal 346 may be provided to a gain unit/amplifier 348 which provides an amplified signal 350 to an equalizer 352. The amplified signal 350 is an example of an amplified third output signal. The equalizer 352 provides the loudspeaker driver signal 322 to the loudspeaker 306. The loudspeaker driver signal 322 is an example of an equalized third output signal. It will be appreciated that one or more of the specific components within the loudspeaker signal processor 320 may not be required in some examples.

The gain unit 348 and equalizer 352 may be configured such that the loudspeaker driver signal 322 provided by the loudspeaker signal processor 320 is configured to enable matching of the ear-level acoustical response of the loudspeaker 306 with that of the headphones 302, 304 in a frequency region of interest. An example of such a frequency region may be any frequency above the cut-off frequency of the filter 344 in examples where a high-pass filter is used.

Figure 3B:
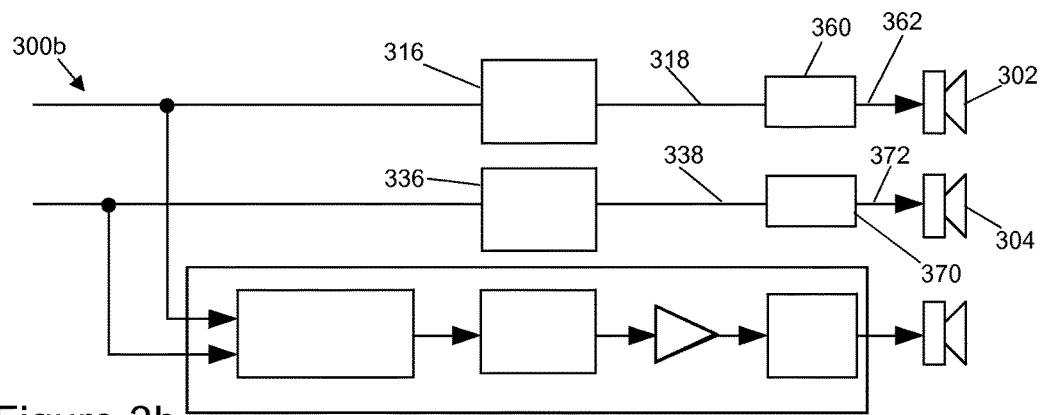
FIG. 3b shows a schematic diagram similar to that of FIG. 3a and further including delay lines.

FIG. 3b illustrates the arrangement of a signal processing circuit 300b similar to the circuit shown in FIG. 3a. Parts shown in FIG. 3b that are similar to corresponding parts in FIG. 3a have been given corresponding reference numerals and will not necessarily be described again in order to aid the clarity of this disclosure.

The signal processing circuit 300b further comprises a left delay line 360 situated between the left headphone signal processor 316 and the left headphone 302. The left delay line 360 receives the left driver signal 318 and processes the signal by introducing/applying a time delay. The left delay line 360 provides a delayed left driver signal 362 to the left headphone 302. The delayed left driver signal 362 is an example of a delayed first output signal. It will be appreciated that other standard components may be present in the arrangement, for example the left delay line 360 may provide the delayed left driver signal 362 to an amplifier (not shown) or other standard signal processing circuit before the signal is provided to the left headphone 302.

The signal processing circuit 300b further comprises a right delay line 370 situated between the right headphone signal processor 336 and the right headphone 304. The right delay line 370 receives the right driver signal 338 and processes the signal by introducing/applying a time delay. The right delay line 370 provides a delayed right driver signal 372 to the right headphone 304. The delayed right driver signal 372 is an example of a delayed second output signal. It will be appreciated that other standard components may be present in the arrangement, for example the right delay line 370 may provide the delayed right driver signal 372 to an amplifier (not shown) or other standard signal processing circuit before the signal is provided to the right headphone 304.

The introduction of delays to the headphone signal processing paths may be advantageous as it can enable coordination of the audio signals received by the user's ears. Without the use of delay lines the signals from a loudspeaker may arrive at a user's ear approximately 1 ms, or more, later than those provided by the headphones. Delays of this order can be important in determining whether a user will correctly localize the origin of a sound. For example a sound may arrive at a user's ear directly and then after a short delay indirectly via a reflection from part of the user's body such as from their shoulder or torso. The use of delay lines can allow a device to use subtle variations in the time of arrival of sound at the user's ears in order to increase the user's perception that the sound originated from the vicinity of a display screen.

Figure 4A:
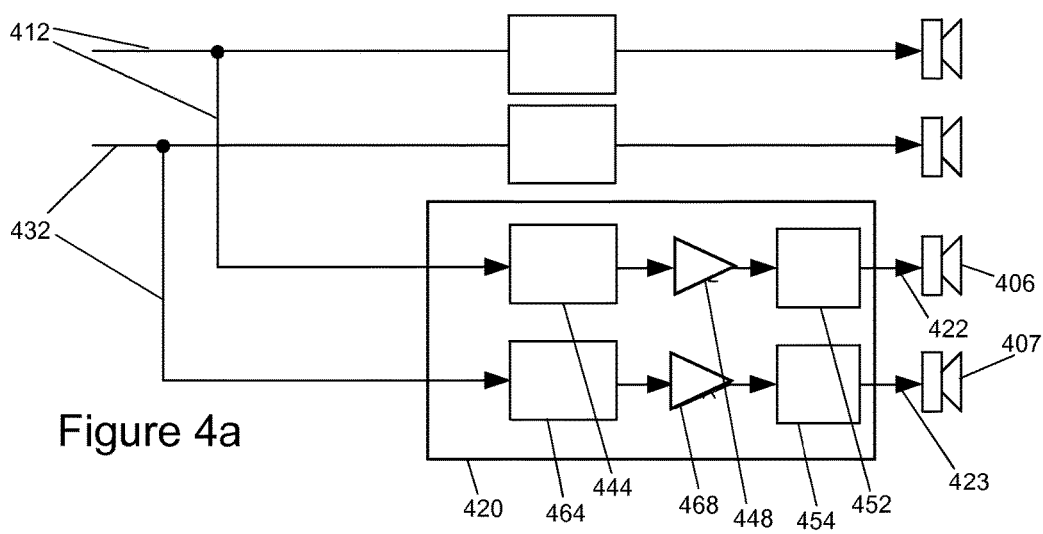
FIG. 4a shows a schematic diagram that illustrates the operation of a signal processing circuit configured for use with both headphones and a pair of loudspeakers simultaneously.

FIG. 4a illustrates the arrangement of a signal processing circuit 400 similar to the circuit shown in FIG. 3a. Parts shown in FIG. 4a that are similar to corresponding parts in FIG. 3a have been given corresponding reference numerals and will not necessarily be described again in order to aid the clarity of this disclosure.

The circuit 400 is configured to provide stereo sound to a user by providing signals to stereo headphones and also, simultaneously, to a left loudspeaker 406 and a right loudspeaker 407. The loudspeaker signal processor 420 receives a left input signal 412 and a right input signal 432. The left input signal 412 is received by a left filter 444 which provides a left filtered signal to a left gain unit 448, which in turn provides a left amplified signal to a left equalizer 452, which in turn provides a left driver signal 422 to the left loudspeaker 406. Similarly, the right input signal 432 is received by a right filter 464 which provides a right filtered signal to a right gain unit 468, which in turn provides a right amplified signal to a right equalizer 454, which in turn provides a right driver signal 423 to the right loudspeaker 407. The left driver signal 422 is an example of a third output signal, which is based on a first input signal (the left input signal 412), and is suitable for driving a first loudspeaker (the left loudspeaker 406). The right driver signal 423 is an example of a fourth output signal, which based on a second input signal (the right input signal 432), and is suitable for driving a second loudspeaker (the right loudspeaker 407).

In this example, the loudspeaker signal processor 420 comprises the left filter 444, the left gain unit 448, the left equalizer 452, the right filter 464, the right gain unit 468, and the right equalizer 454.

The presence of one or more of the filters, gain units and equalizers can enable the circuit 400 to provide sound from the loudspeakers 406, 407 that will enable a user to localize the audio content as coming from outside of the user's head and from a specific location, such as the vicinity of a display screen.

Figure 4B:
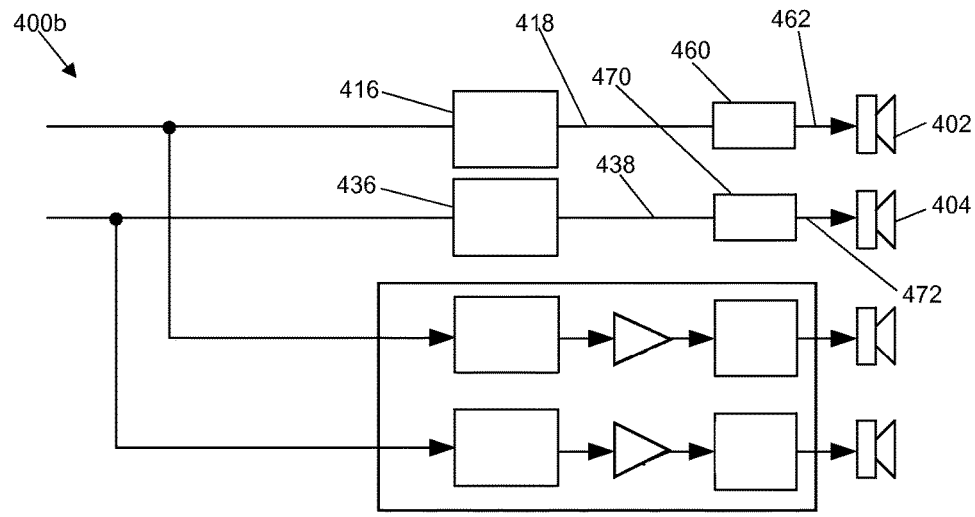
FIG. 4b shows a schematic diagram similar to that of FIG. 4a and further including delay lines.

FIG. 4b illustrates the arrangement of a signal processing circuit 400b similar to the circuit shown in FIG. 3b and to the circuit 400 shown in FIG. 4a. Parts shown in FIG. 4b that are similar to corresponding parts in FIG. 3b or 4a have been given corresponding reference numerals and will not necessarily be described again in order to aid the clarity of this disclosure.

The circuit 400b comprises a left delay line 460 located between a left signal processor 416 and a left headphone 402. The circuit 400b further comprises a right delay line 470 located between a right signal processor 436 and a right headphone 404. These delay lines are configured to provide delayed signals to the headphones for the same reasons and in the same way as the delay lines described above in relation to the circuit 300b shown in FIG. 3b.

Figure 5A:
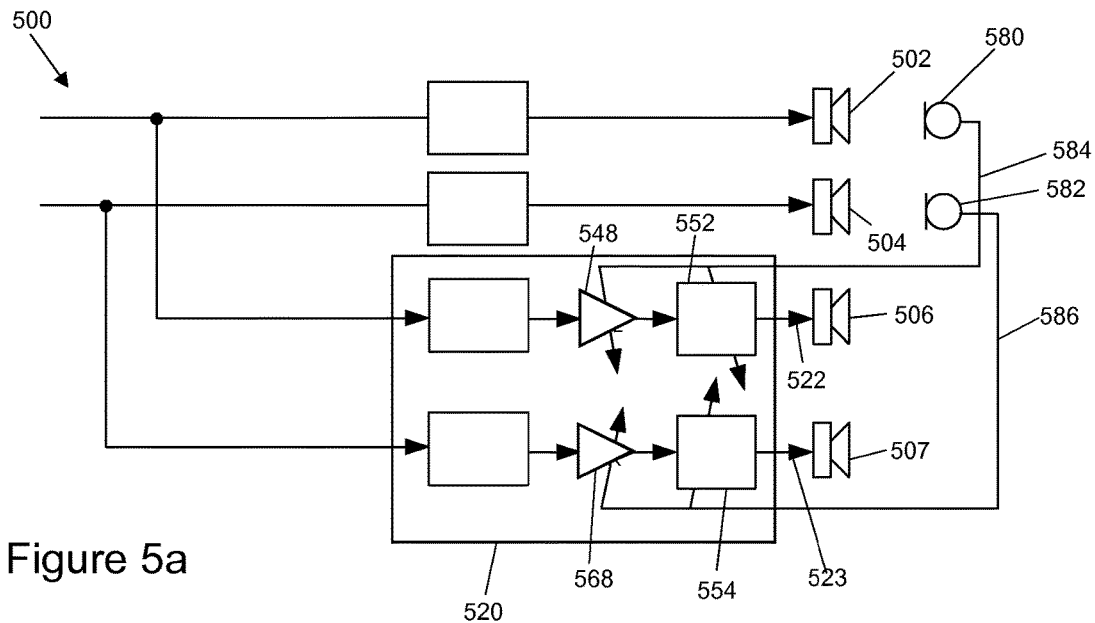
FIG. 5a shows a schematic diagram similar to that of FIG. 4a and further including a pair of microphones configured to provide adaptive control of parts of the circuit.

FIG. 5a illustrates the arrangement of a signal processing circuit 500 similar to the circuit shown in FIG. 4a. Parts shown in FIG. 5a that are similar to corresponding parts in FIG. 4a have been given corresponding reference numerals and will not necessarily be described again in order to aid the clarity of this disclosure.

The circuit 500 comprises a left microphone 580 and a right microphone 582. The left microphone 580 is situated on, inside, or near to the left headphone 502. The right microphone 582 is situated on, inside, or near the right headphone 504. Such microphones 580, 582 may be located in noise-cancelling headphones. Both microphones 580, 582 are configured to measure sound arriving at the respective headphone from external sources, such as the loudspeakers 506, 507. For example, the microphones 580, 582 may measure the intensity and/or frequency of the sound. Both microphones 580, 582 are configured to provide information signals representative of detected sounds to the loudspeaker signal processor 520. It will be appreciated that various techniques may be employed to identify which sounds detected by the microphones were generated by the left loudspeaker 506 or the right loudspeaker 507 and not by some other unrelated background noise. Such techniques include adaptive filtering or cross-correlation.

In this example, the circuit 500 includes a variable left gain unit 548, a variable left equalizer 552, a variable right gain unit 568, and a variable right equalizer 554.

The left microphone 580 is configured to provide a left information signal 584 to the variable left gain unit 548 and to the variable left equalizer 552. The left information signal 584 relates to sounds detected by the left microphone 580 and can be used by the variable left gain unit 548 and the variable left equalizer 552 as a control signal. The left gain unit 548 is configured to alter the level of gain applied to the signal received at its input (which may be a filtered left signal) based on the received left information signal 584. The left equalizer 552 is configured to adapt the level of equalization applied to the signal received at its input (which may be an amplified left signal) based on the received left information signal 584. These alterations and adaptations can enable the circuit 500 to provide an adapted left driver signal 522 to the left loudspeaker 506, as discussed in more detail below.

Similarly, the right microphone 582 is configured to provide a right information signal 586 to the variable right gain unit 568 and to the variable right equalizer 554. The right information signal 586 relates to sounds detected by the right microphone 582 and can be used by the variable right gain unit 568 and the variable right equalizer 554 as a control signal. The right gain unit 568 is configured to alter the level of gain applied to the signal received at its input (which may be a filtered right signal) based on the received right information signal 586. The right equalizer 554 is configured to adapt the level of equalization applied to the signal received at its input (which may be an amplified right signal) based on the received right information signal 586. These alterations and adaptations can enable the circuit 500 to provide an adapted right driver signal 523 to the right loudspeaker 507, again as discussed below.

The left microphone is an example of a first microphone for providing a first information signal (the left information signal 584), relating to measured sounds, to a signal processing circuit (the loudspeaker signal processor 520). The right microphone is an example of a second microphone for providing a second information signal (the right information signal 586), relating to measured sounds, to a signal processing circuit (the loudspeaker signal processor 520).

The signal processing circuit (the loudspeaker signal processor 520) can adjust or set one or more of the following based on the left information signal 584 and/or the right information signal 586:
  a level of gain applied by a gain unit;
  a level of equalization applied by an equalizer; and
  a length of a delay applied by a delay line.

The adapted left driver signal 522 and the adapted right driver signal 523 may provide for more suitable sounds to be generated by the loudspeakers to improve the localisation of the sounds perceived by the user. This adaptation process may remove or reduce the need to calibrate the circuit 500 as the circuit 500 is configured to automatically adjust its performance in line with new situations, as discussed below. Changes in situation may include the user moving their head closer to or further away from a display screen and may include the user rotating their head such that one headphone gets closer to a display screen while the other headphone gets further away. Different situations may also arise depending on the environment in which the user is situated; sound may reach the headphones from the loudspeakers by multiple paths including paths involving reflections from walls or other objects. As the location of the user varies relative to objects in the environment, so the circuit 500 may modify the gain and equalization that is applied in order to ensure that the sound received at the microphone is configured to complement the sound provided directly by the headphones. This can advantageously support localisation of the sound perceived by the user.

In some examples the left microphone 580 and right microphone 582 may be mounted between the headphone speakers and the respective user's ear, when in use. This arrangement advantageously allows the circuit 500 to measure the sound provided by the loudspeakers that has been transmitted through the headphones. This enables the circuit 500 to adjust the gain and equalization of the adapted left driver signal 522 and the adapted right driver signal 523 to compensate for changes in the transmission of sound through the headphone. Such changes may occur if the headphone is an in-ear device that does not fit the user correctly.

Figure 5B:
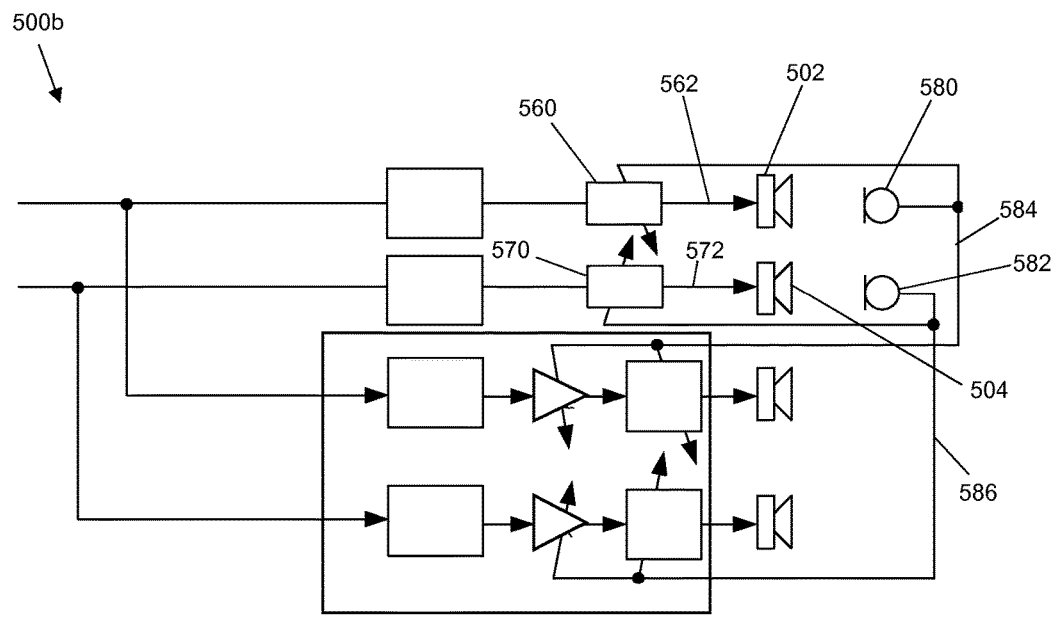
FIG. 5b shows a schematic diagram similar to that of FIG. 5a and further including delay lines.

FIG. 5b illustrates the arrangement of a signal processing circuit 500b similar to the circuit shown in FIG. 5a. Parts shown in FIG. 5b that are similar to corresponding parts in FIG. 5a have been given corresponding reference numerals and will not necessarily be described again in order to aid the clarity of this disclosure.

The circuit 500b further comprises a variable left delay line 560 and a variable right delay line 570. The operation of these variable delay lines is similar to that of the delay lines described above in relation to FIGS. 3b and 4b, except that the length of the time delay can be set in accordance with a control signal. The variable left delay line 560 may be configured to receive the left information signal 584 representative of sound detected by the left microphone 580. The variable left delay line 560 may be configured to modify the length of the delay based on the received left information signal 584.

Similarly, the variable right delay line 570 may be configured to receive the right information signal 586 representative of sound detected by the right microphone 582. The right delay line 570 may be configured to modify the length of the delay based on the received right information signal 586.

Examples of how the length of the delay can be set are provided below. The length of the delay required to provide an improved localisation of the sound perceived by the user can depend on, for example, the distance between the user's ears and the loudspeakers. The closer the user is to the loudspeakers the shorter the required delay. It will be appreciated that different delays may be advantageously applied by the left delay line 560 compared to the right delay line 570 in accordance with the received respective information signals.

It will be appreciated that in some examples (not shown) the information about received sound detected by the microphones may be used to adaptively vary the properties of any filter within circuits 500, 500b illustrated in FIG. 5a or 5b.

Control of the different variable components discussed above may be based on any known adaptive filtering techniques designed to minimize an error signal E defined by the following equation considered in the frequency domain: E=H−L1−L2. Here, H is the contribution from a headphone speaker, L1 is the contribution from the left loudspeaker and L2 is the contribution of the right loudspeaker. It will be appreciated that this equation may be applied to either left or right headphones and may provide different adaptations to the signals supplied to the different headphones and loudspeakers.

More specifically, adaptive filtering techniques can be applied so as to minimize the error signal given by (for the left ear, expressed in the frequency domain) the following equation for a system such as the one illustrated in FIG. 5b, which has two loudspeakers:

$$E_L = (L_{in} \times F1 \times \Delta t_L \times HP2E_L) - (L_{in} \times F2 \times G_L \times EQ_L \times LS1E_L) - (R_{in} \times F2 \times G_R \times EQ_R \times LS2E_L)$$

Here, $E_L$ can be considered as error signal for signals received at the user's left ear in that it represents the difference between a signal received at the user's left ear from the left headphone (the first bracketed term) and signals received from first and second loudspeakers (the second and third bracketed terms).

$L_{in}$ is the left input signal, F1 represents filter characteristics provided by a left headphone signal processor, $\Delta t_L$ is a delay provided by a left delay line, $HP2E_L$ is the headphone to left ear transfer function, F2 represents filter characteristics provided by a loudspeaker signal processor, $G_L$ is a gain provided by a left gain unit, $EQ_L$ is an equalization provided by a left equalizer, $LS1E_L$ is the first loudspeaker to left ear transfer function, $R_{in}$ is the right input signal that is provided to the second loudspeaker, $G_R$ is a gain provided by a right gain unit, $EQ_R$ is an equalization provided by a right equalizer, and $LS2E_L$ is the second loudspeaker to left ear transfer function.

Also, control of one or more the different variable components, especially the delay lines, can be set in accordance with any other sensor signal, including known techniques that utilise video processing, face recognition and any cross-correlation processing.

Use of feedback microphones can be used to continuously match the ear-level acoustical responses of the loudspeakers (which may be referred to as hands-free speakers) with the headphone speakers. This can remove or reduce the need for calibration of the gains, delays and equalizers and can make the system robust against variations in the headphone transfer functions $HP2E_L$ and $HP2E_R$, which can particularly occur in earphones suffering from ear fit variations.

It will be appreciated that a similar expression can be applied for the right ear.

Figure 6:
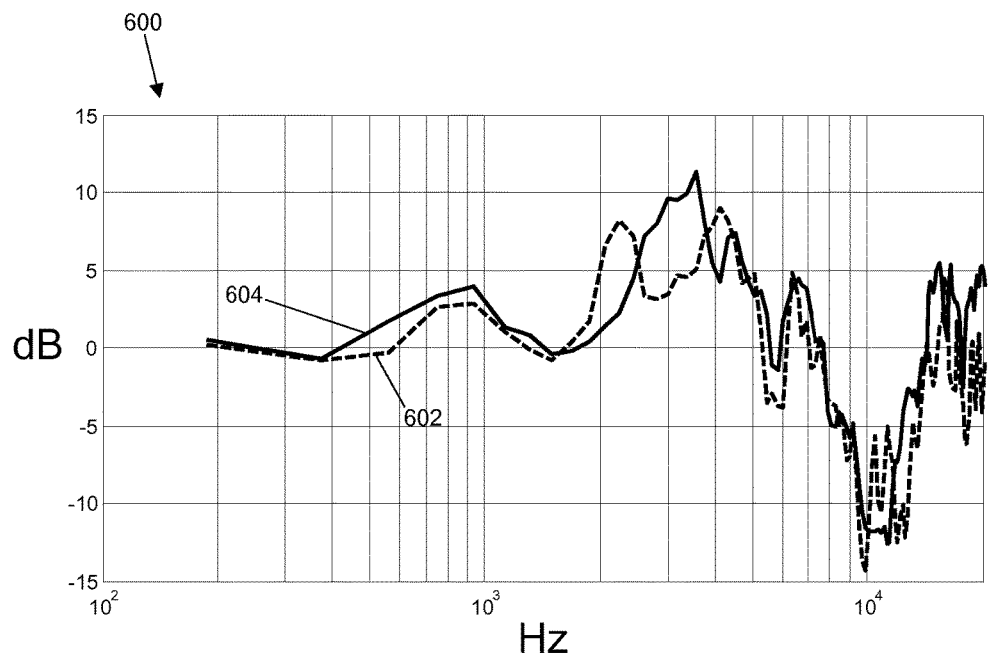
FIG. 6 shows a chart that illustrates measurements of decibels as a function of frequency of audio signals provided by both a full-range loudspeaker and a microspeaker.

FIG. 6 shows a chart 600 that displays measurement of the head-related transfer functions for a human subject. Frequency, in Hertz, is shown on the horizontal axis. Normalized sound pressure level, in decibels, is shown on the vertical axis. The ear canal of the subject was blocked and a microphone was used to measure the intensity of sound as a function of frequency over the range of frequencies that are known to be important in determining a person's perception of localisation of sound. A first measurement 602 show results obtained from sound played through a full size loudspeaker. A second measurement 604 shows results obtained from sound played through a microspeaker type loudspeaker of the type commonly used in mobile devices. Although the results are not identical, considerable similarity can be seen. This observation shows that the methods disclosed herein may be applied to devices that have either full size loudspeakers or microspeakers and can provide essentially the same advantageous functionality in either case.

It will be appreciated that any of the circuits disclosed above may further comprise a switch configured to enable a user to switch the simultaneous playback of audio through the headphones and loudspeakers on or off. The switch is an example of a user interface. The switch may be embodied by software, and it may be provided on a graphical user interface with which a user can interact. The switch on the graphical user interface may be presented to a user when the device detects that headphones have been plugged into the device, or the switch may be accessible through a menu. Thus, these devices may be used with the loudspeaker or loudspeakers providing sound in order to support superior sound localization, or they may be used with the loudspeakers switched off in a conventional mode if desired.

One or more of the circuits disclosed herein may be used with any device that supports audio playback through headphones and one or more loudspeakers, and may advantageously improve a user's perception of sound localization whenever it is beneficial or desirable to localize sound outside the user's head.

One or more examples disclosed herein relate to systems and methods for improving the out-of-head experience and front localisation performance of headphones connected to a mobile device. They can include augmenting the headphone rendering by playing an audio signal derived from the headphone audio signal through hands-free speakers integrated in the mobile device in such a way that they can provide spatial audio cues that help localize the sound as coming from the mobile device display. Advantageously, they can make use of standard components of mobile devices and may not require additional hardware/sensors.

Examples described herein can be considered better that using individualized head-related transfer functions (HRTFs) or head-tracking. The collection of individualized HRTFs, can be very time-consuming and impractical especially in consumer applications. Also, head-tracking can require dedicated sensors (accelerometers) and hardware inputs to sense the head rotation.

It will be appreciated that any components that are described herein as being coupled or connected could be directly or indirectly coupled or connected. That is, one or more components could be located between two components that are said to be coupled or connected whilst still enabling the required functionality to be achieved.

The invention claimed is:

1. A signal processing circuit comprising:
   a first signal processor configured to receive a first input signal and to process the first input signal to produce a first output signal suitable for driving a first headphone speaker;
   a second signal processor configured to receive a second input signal and to process the second input signal to produce a second output signal suitable for driving a second headphone speaker;
   a third signal processor configured to receive the first input signal and/or the second input signal and to produce, based on the received signal or signals, a third output signal suitable for driving a first loudspeaker; and
   wherein the first output signal is configured to be provided to the first headphone speaker, the second output signal is configured to be provided to the second headphone speaker, and the third output signal is configured to be provided to the first loudspeaker;
   wherein the third signal processor includes a high pass filter.

2. The signal processing circuit of claim 1, wherein:
   the first signal processor comprises a first filter; and
   the second signal processor comprise a second filter.

3. The signal processing circuit of claim 2, wherein the first filter is a low pass filter and the second filter is a low pass filter.

4. The signal processing circuit of claim 1, wherein the first signal processor comprises a first delay line configured to provide a delayed first output signal and the second signal processor comprises a second delay line configured to provide a delayed second output signal.

5. The signal processing circuit of claim 4, wherein:
   the first headphone comprises a first microphone configured to provide a first information signal, relating to measured sounds, to the signal processing circuit, wherein the signal processing circuit is configured to set the length of a delay applied by the first delay line based on the first information signal; and
   the second headphone comprises a second microphone configured to provide a second information signal, relating to measured sounds, to the signal processing circuit, wherein the signal processing circuit is configured to set the second delay line based on the second information signal.

6. The signal processing circuit of claim 1, further comprising:
   a switching signal processor configured to receive a switching signal from a user interface; and
   wherein, the first output signal, the second output signal and the third output signal are provided based on the switching signal.

7. The signal processing circuit of claim 1, wherein the third signal processor is configured to receive the first input signal and the second input signal, and is also configured to produce:
   the third output signal, based on the first input signal;
   a fourth output signal, based on the second input signal, suitable for driving a second loudspeaker; and
   provide the first output signal to the first headphone speaker, the second output signal to the second headphone speaker, the third output signal to the first loudspeaker, and the fourth output signal to the second loudspeaker.

8. The signal processing circuit of claim 1, wherein the third signal processor comprises a gain unit configured to provide an amplified third output signal.

9. The signal processing circuit of claim 8, wherein the first headphone comprises a first microphone configured to provide a first information signal, relating to measured sounds, to the signal processing circuit, wherein the signal processing circuit is configured to set a level of gain applied by the gain unit based on the first information signal.

10. The signal processing circuit of claim 1, wherein the third signal processor comprises an equaliser configured to provide an equalised third output signal.

11. The signal processing circuit of claim 10, wherein the first headphone comprises a first microphone configured to provide a first information signal, relating to measured sounds, to the signal processing circuit, wherein the signal processing circuit is configured to set the level of equalisation applied by the equaliser based on the first information signal.

12. An integrated circuit comprising the signal processing circuit of claim 1.

13. An electronic device comprising the signal processing circuit of claim 1, a first headphone speaker, a second headphone speaker and a first loudspeaker, wherein the first headphone speaker is configured to provide audio to a user in accordance with the first output signal, the second headphone speaker is configured to provide audio to the user in accordance with the second output signal, and the first loudspeaker is configured to provide audio to the user in accordance with the third output signal.

14. A signal processing circuit comprising:
a first signal processor configured to receive a first input signal and to process the first input signal to produce a first output signal suitable for driving a first headphone speaker;
a second signal processor configured to receive a second input signal and to process the second input signal to produce a second output signal suitable for driving a second headphone speaker;
a third signal processor configured to receive the first input signal and/or the second input signal and to produce, based on the received signal or signals, a third output signal suitable for driving a first loudspeaker; and
wherein the first output signal is configured to be provided to the first headphone speaker, the second output signal is configured to be provided to the second headphone speaker, and the third output signal is configured to be provided to the first loudspeakers;
wherein the third signal processor comprises a gain unit configured to provide an amplified third output signal; and
wherein the first headphone comprises a first microphone configured to provide a first information signal, relating to measured sounds, to the signal processing circuit, wherein the signal processing circuit is configured to set a level of gain applied by the gain unit based on the first information signal.

15. The signal processing circuit of claim 14, wherein:
the first signal processor comprises a first filter;
the second signal processor comprise a second filter; and
either the first or second filter is a low pass filter.

16. The signal processing circuit of claim 14, wherein the third signal processor includes a high pass filter.

17. The signal processing circuit of claim 14, wherein the first signal processor comprises a first delay line configured to provide a delayed first output signal and the second signal processor comprises a second delay line configured to provide a delayed second output signal;
wherein the signal processing circuit is configured to set the length of a delay applied by the first delay line based on the first information signal; and
wherein the second headphone comprises a second microphone configured to provide a second information signal, relating to measured sounds, to the signal processing circuit, wherein the signal processing circuit is configured to set the second delay line based on the second information signal.

18. A signal processing circuit comprising:
a first signal processor configured to receive a first input signal and to process the first input signal to produce a first output signal suitable for driving a first headphone speaker;
a second signal processor configured to receive a second input signal and to process the second input signal to produce a second output signal suitable for driving a second headphone speaker;
a third signal processor configured to receive the first input signal and/or the second input signal and to produce, based on the received signal or signals, a third output signal suitable for driving a first loudspeaker;
wherein the first output signal is configured to be provided to the first headphone speaker, the second output signal is configured to be provided to the second headphone speaker, and the third output signal is configured to be provided to the first loudspeakers;
wherein the third signal processor comprises an equaliser configured to provide an equalised third output signal; and
wherein the first headphone comprises a first microphone configured to provide a first information signal, relating to measured sounds, to the signal processing circuit, wherein the signal processing circuit is configured to set the level of equalisation applied by the equaliser based on the first information signal.

* * * * *